United States Patent
Yates (10) Patent No.: US 9,541,033 B2
(45) Date of Patent: Jan. 10, 2017

(54) GASEOUS FUEL AND AIR MIXING VENTURI INSERT DEVICE FOR CARBURETOR

(71) Applicant: Continental Controls Corporation, San Diego, CA (US)

(72) Inventor: Kristian W. Yates, Valley Center, CA (US)

(73) Assignee: CONTINENTAL CONTROLS CORPORATION, San Diego, CA (US)

(*) Notice: Subject to any disclaimer, the term of this patent is extended or adjusted under 35 U.S.C. 154(b) by 110 days.

(21) Appl. No.: 14/459,009

(22) Filed: Aug. 13, 2014

(65) Prior Publication Data

US 2015/0061164 A1    Mar. 5, 2015

Related U.S. Application Data

(60) Provisional application No. 61/871,521, filed on Aug. 29, 2013.

(51) Int. Cl.

| | |
|---|---|
| *B01F 3/04* | (2006.01) |
| *F02M 7/02* | (2006.01) |
| *F02M 19/08* | (2006.01) |
| *F02M 21/04* | (2006.01) |
| *F02M 19/10* | (2006.01) |
| *B01F 5/04* | (2006.01) |
| *F02M 13/08* | (2006.01) |

(52) U.S. Cl.
CPC ........ *F02M 21/047* (2013.01); *B01F 3/04056* (2013.01); *B01F 5/0413* (2013.01); *F02M 7/02* (2013.01); *F02M 13/08* (2013.01); *F02M 19/08* (2013.01); *F02M 19/10* (2013.01); *F02M 21/04* (2013.01); *Y02T 10/32* (2013.01); *Y10T 29/49233* (2015.01)

(58) Field of Classification Search
CPC ..... B01F 3/04; B01F 3/04007; B01F 3/04021; B01F 3/04049; B01F 3/04056; B01F 5/04; B01F 5/0413; F02M 21/04; F02M 7/02; F02M 7/12; F02M 19/08; F02M 19/10
USPC .................... 261/40, 64.1, 76, 78.2, DIG. 12
See application file for complete search history.

(56) References Cited

U.S. PATENT DOCUMENTS

| | | | | |
|---|---|---|---|---|
| 1,373,550 | A | * | 4/1921 | Chandler ............... F02M 21/00 261/44.5 |
| 1,562,651 | A | * | 11/1925 | Mock ...................... F02M 7/11 261/121.3 |
| 1,631,716 | A | | 6/1927 | Baverey |

(Continued)

OTHER PUBLICATIONS

Continental Controls Corporation. "Mixing Venturi VM-350 for Mixing Air and Fuel to Gas Engines." 2003, 2 pages.

(Continued)

*Primary Examiner* — Robert A Hopkins
(74) *Attorney, Agent, or Firm* — Procopio, Cory, Hargreaves & Savitch, LLP (57) ABSTRACT

A gaseous fuel and air mixing venturi device is adapted for installation in a gaseous fuel carburetor and has a venturi body defining annular inner and outer venturi passageways which each have a throat of reduced cross-sectional area and have inlet ends in communication with an air inlet of the carburetor. A fuel inlet is configured for connection to a fuel port of the carburetor, and communicates with a plurality of fuel supply ports in the body communicating radially with the inner and outer venturi passages to mix with the air flowing in the passageways.

16 Claims, 7 Drawing Sheets

(56) References Cited

U.S. PATENT DOCUMENTS

| | | | |
|---|---|---|---|
| 2,039,353 | A | 5/1936 | Seidel |
| 2,857,145 | A | 10/1958 | Morris |
| 2,939,775 | A | 6/1960 | Middleton et al. |
| 3,123,451 | A | 3/1964 | Baverstock |
| 3,545,948 | A | 12/1970 | Baverstock |
| 3,843,338 | A | 10/1974 | Zonker et al. |
| 4,073,832 | A | 2/1978 | McGann |
| 4,308,843 | A | 1/1982 | Garretson |
| 4,335,697 | A | 6/1982 | McLean |
| 4,375,438 | A | 3/1983 | McKay |
| 4,387,685 | A | 6/1983 | Abbey |
| 4,387,689 | A | 6/1983 | Brown |
| 4,425,140 | A | 1/1984 | Lassanske et al. |
| 4,425,898 | A | 1/1984 | McLean |
| 4,479,466 | A | 10/1984 | Greenway et al. |
| 4,894,067 | A | 1/1990 | Bayerstock |
| 7,410,152 | B2 | 8/2008 | Yates |

OTHER PUBLICATIONS

Heinzmann GmbH & Co. KG Speed Governors. "Gas and Air Mixers." Specification. 2005, 2 pages.

\* cited by examiner

GASEOUS FUEL AND AIR MIXING VENTURI INSERT DEVICE FOR CARBURETOR

FIELD OF THE INVENTION

The present invention relates generally to devices for mixing gaseous fuel and air for combustion in a gas engine, and is particularly concerned with a venturi mixing insert device for a gaseous fuel carburetor for natural gas engines and the like.

BACKGROUND OF THE INVENTION

The majority of gaseous fuel carburetors for internal combustion engines have an air/fuel mixing section which is comprised of a spring mass system. This has the potential to create unstable engine performance due to interaction with the upstream pressure regulator or emissions control valve. The carburetor was originally designed to run open loop with a mechanical upstream pressure regulator, and on applications that did not have strict emissions requirements. In recent years emissions requirements have become very strict, and more sophisticated upstream air/fuel ratio controls have either replaced the mechanical pressure regulator entirely or supplement its operation. These devices are typically electromechanical and respond to the commands of a computer controller using a closed loop control strategy, based on the output of an oxygen sensor, located in the exhaust stream of the engine. These new systems can respond very quickly and often create unstable interactions between the carburetor and the upstream fuel valve. This interaction is possible because the air/fuel mixing section of the carburetor is comprised of a dynamic spring mass system.

There are several existing types of gaseous fuel carburetors and the majority use a diaphragm to actuate the air fuel mixing section against the force of a spring. The smallest model eliminates the diaphragm and uses a piston as the operator. The diaphragm is typically an elastomer coated fabric and is susceptible to chemical and thermal degradation, rupture due to engine backfiring, abrasive damage, and the like. The air/fuel mixing section of the carburetor also has sliding surfaces that are prone to wear. Down time of an engine due to required maintenance in an industrial application, such as a pump on an oil pipeline, can result in the loss of thousands of dollars from lost production.

Another deficiency of known gaseous fuel carburetors is the limited ability to thoroughly mix the air and fuel together. The fuel is introduced into the center of the air stream from a single location. This can create a lean mixture at the outer edges of the flow stream and a richer mixture in the center. This makes it more difficult for the engine to completely burn all incoming fuel, which often results in higher exhaust emissions and a reduction in horsepower.

Venturi mixers have been developed for gaseous-fueled engines in order to overcome some of the problems of the existing gaseous fuel carburetors with a spring-mass system forming the air/fuel mixing section. One example is the FMV6 Mixing Venturi manufactured by Continental Controls Corporation of San Diego, Calif. Other such devices are manufactured by Woodward and Heinzmann. These mixers are not installed in the existing carburetor. Instead, they replace the carburetor entirely, which often creates substantial installation difficulties and costs. The physical envelope of these mixers is typically very different from the existing carburetor. This requires major modifications to the engine's air intake system, which could result in thousands of dollars of lost production time. Another major deficiency is that these mixers do not include a butterfly for controlling the air/fuel mixture to the engine. In some instances the existing butterfly is separable from the carburetor and can be used with custom adapters. If the butterfly is not separable from the carburetor, a new butterfly may have to be purchased. If the location of the butterfly is different from the previous installation, additional changes to the governor linkage will be required. An additional mixture screw will also be required. Conventional retrofit difficulties increase significantly when the engine uses more than one carburetor, which is often the case.

U.S. Pat. No. 7,410,152 of Continental Controls Corporation describes a gaseous fuel and air mixing venturi device for a carburetor which can be used to replace a conventional spring mass air/fuel mixing section of the carburetor to produce better mixing.

SUMMARY OF THE INVENTION

Embodiments described herein provide a gaseous fuel and air mixing venturi device which is adapted for installation in a gaseous fuel carburetor and has a venturi body defining at least two venturi passageways in communication with an air inlet of the carburetor, a fuel inlet configured for connection to a gaseous fuel inlet port of the carburetor, and a plurality of fuel supply ports in the body communicating with the fuel inlet for supplying fuel to throat areas of the venturi passageways to mix with the air flowing in the passageways. The passageways have outlet ends in communication with the air/fuel mixture outlet of the carburetor. A guide plate is mounted over the inlet end of the body and has a seat which engages the standard carburetor biasing spring extending between the plate and cover plate of the carburetor when the venturi device is installed. The guide plate forms at least part of a passageway for air flow into the inlet ends of the venturi passageways.

In one embodiment, the venturi body has a central hub portion with a first chamber communicating with the fuel inlet which is configured for communication with the fuel port or fuel supply stem of the carburetor. A first annular ring or venturi body member surrounding the hub portion has an internal, annular fuel supply chamber and the chamber has one or more fuel inlets which communicate with the fuel supply chamber. An outer annular ring or rim surrounding the first annular ring is of predetermined configuration and dimensions for seating on an air-fuel mixer seating rim of the carburetor. An inner venturi passageway is formed between the hub and venturi body member, while at least an inlet end portion of an outer venturi passageway is formed between the venturi body member and outer rim of the venturi device.

The annular fuel supply chamber has a plurality of inner and outer fuel outlets for supplying fuel in a radial direction to the inner and outer venturi passageways at throat portions of the passageways which are of reduced cross-sectional dimensions, and the hub portion also has a plurality of fuel outlets for supplying fuel from the first chamber to the throat portion of the inner venturi passageway. Fuel supplied radially into the passageways is mixed with air flowing axially through the venturi passageways for improved air-fuel mixing.

According to another aspect, a gaseous fuel and air mixing venturi device for a gaseous fuel carburetor has a venturi body defining at least one venturi passageway having an air inlet end in communication with an air inlet of the carburetor, an air-fuel outlet end for communication with an air fuel mixture outlet of the carburetor, and a venturi throat of reduced cross-sectional area. The body has a fuel inlet configured for connection to a gaseous fuel inlet port of the carburetor, and a plurality of fuel supply ports in the body communicating with the fuel inlet for directing fuel in radial directions only into the venturi throat of the venturi passageway to mix with the air flowing in the passageway. In one embodiment, the venturi passageway is an annular passageway having opposing inner and outer annular walls, and fuel supply ports are located in the inner and outer walls for directing fuel in opposite radial directions into the venturi throat.

According to another aspect, a method is provided for retrofitting a carburetor by replacing the existing spring mass air/fuel mixing section of the carburetor with a venturi insert device. The fasteners attaching the spring mass air/fuel mixing section in the carburetor are released and the air/fuel mixing section is removed. The venturi insert device is then placed into the cavity left by removal of the old air/fuel mixing section, and the carburetor cover plate and spring are re-positioned over the assembly and secured in place using the same fasteners. The venturi insert device has improved performance over diaphragm operated carburetors used on internal combustion engines, by completely replacing the problematic diaphragm actuator of existing gaseous fuel carburetors.

Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

After reading this description it will become apparent to one skilled in the art how to implement the invention in various alternative embodiments and alternative applications. However, all the various embodiments of the present invention will not be described herein. It is understood that the embodiments presented here are presented by way of an example only, and not limitation. As such, this detailed description of various alternative embodiments should not be construed to limit the scope or breadth of the present invention.

Embodiments described herein provide for a venturi insert device designed to replace a gaseous fuel and air mixer or mixing device in a gaseous fuel carburetor, and having inner and outer annular venturi passageways through which air flows while gaseous fuel is supplied to the passageways for mixing with air via multiple gaseous fuel inlets of the venturi throat areas. The carburetor may be manufactured with the venturi insert device already in place, or existing carburetors may be retrofitted with one or more of the venturi insert devices, depending on whether the carburetor is a smaller device with only one fuel and air mixer or a larger carburetor designed with two or more fuel and air mixers.

Figure 1:
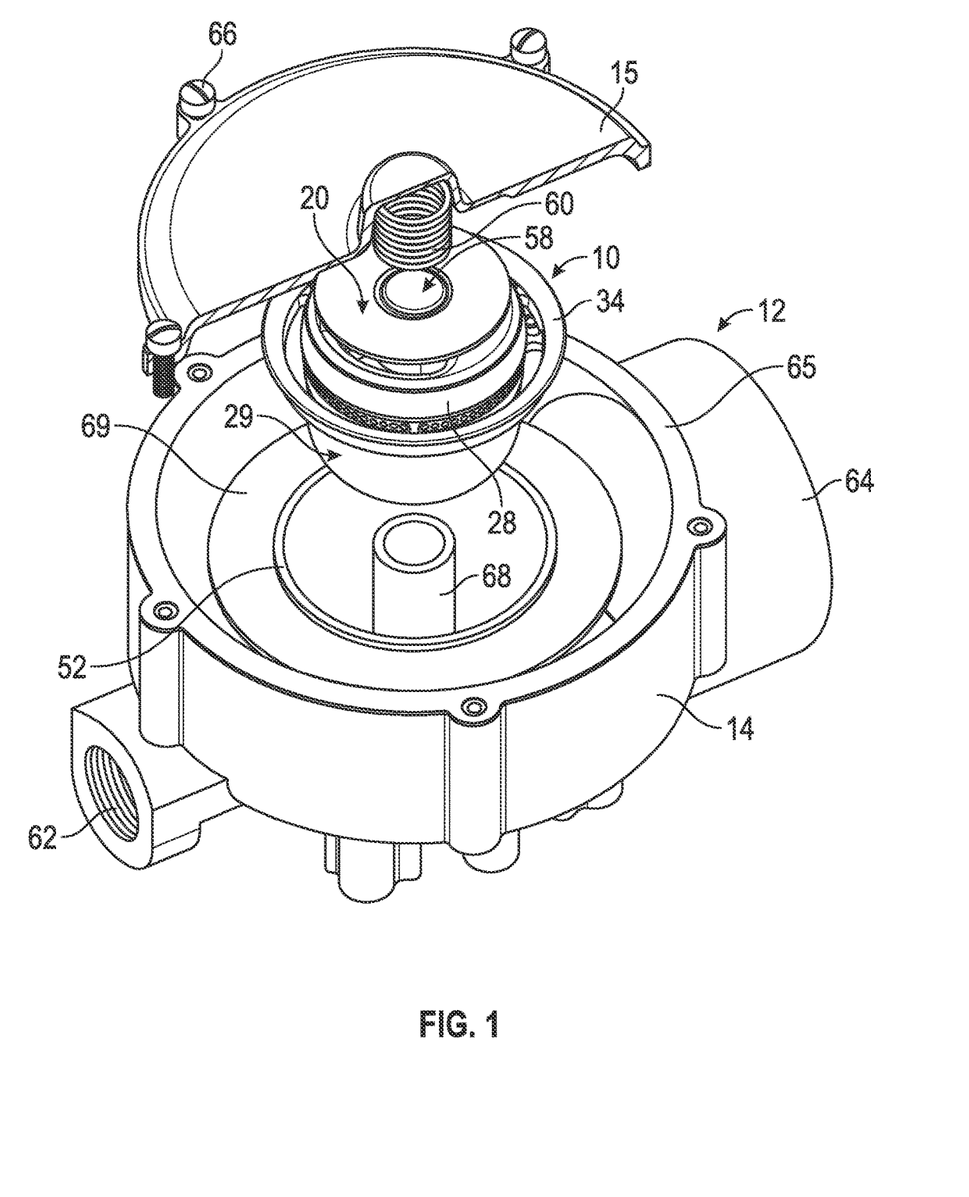
FIG. 1 is a perspective view of one embodiment of a mixing venturi insert device positioned for mounting in a carburetor housing, with the cover of the housing partially cut away to reveal the venturi insert device.
Figure 7:
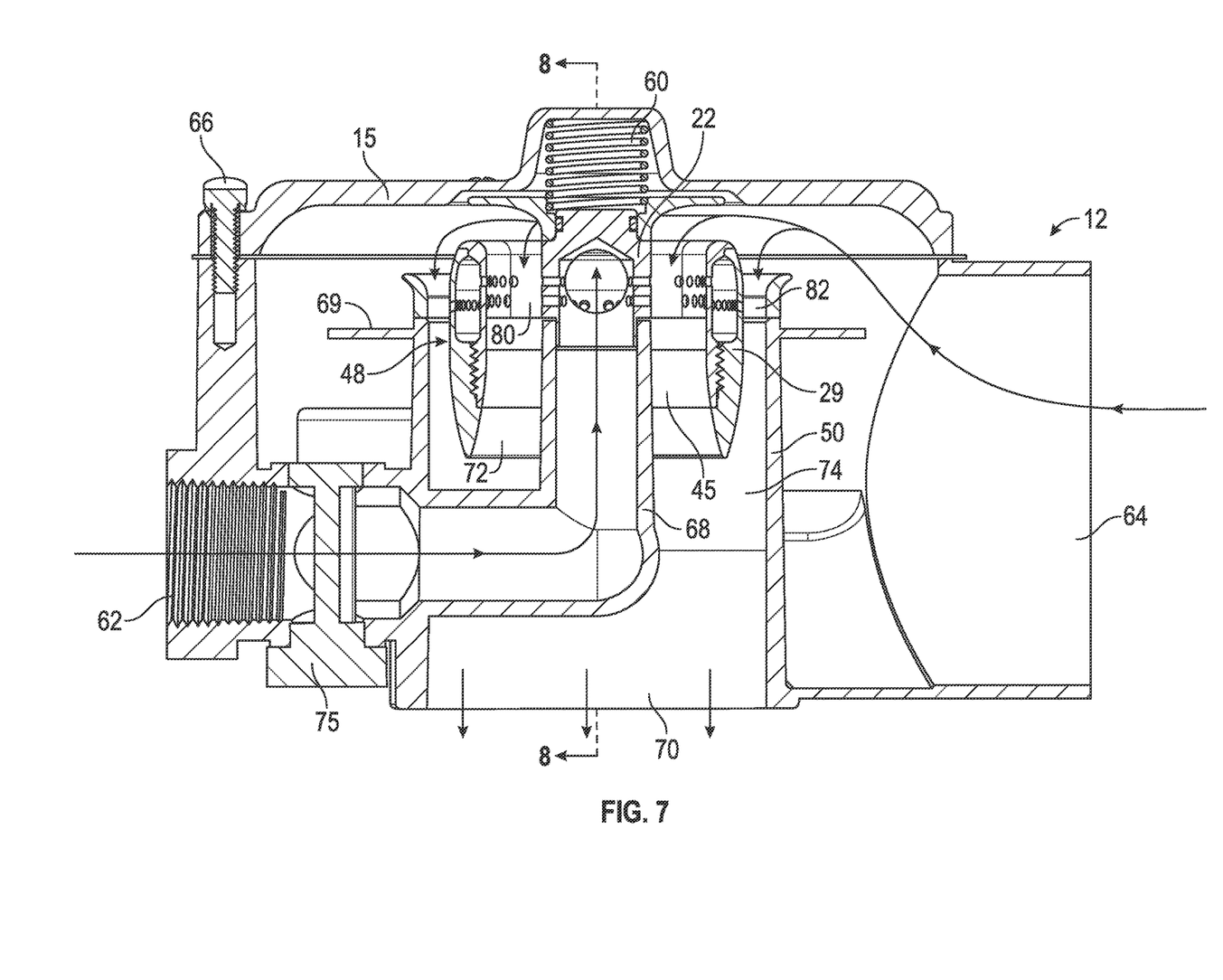
FIG. 7 is a cross section similar to FIG. 5 illustrating the venturi insert device installed in the carburetor and in communication with the carburetor air and gaseous fuel inlets and carburetor air-fuel mixture outlet.
Figure 8:
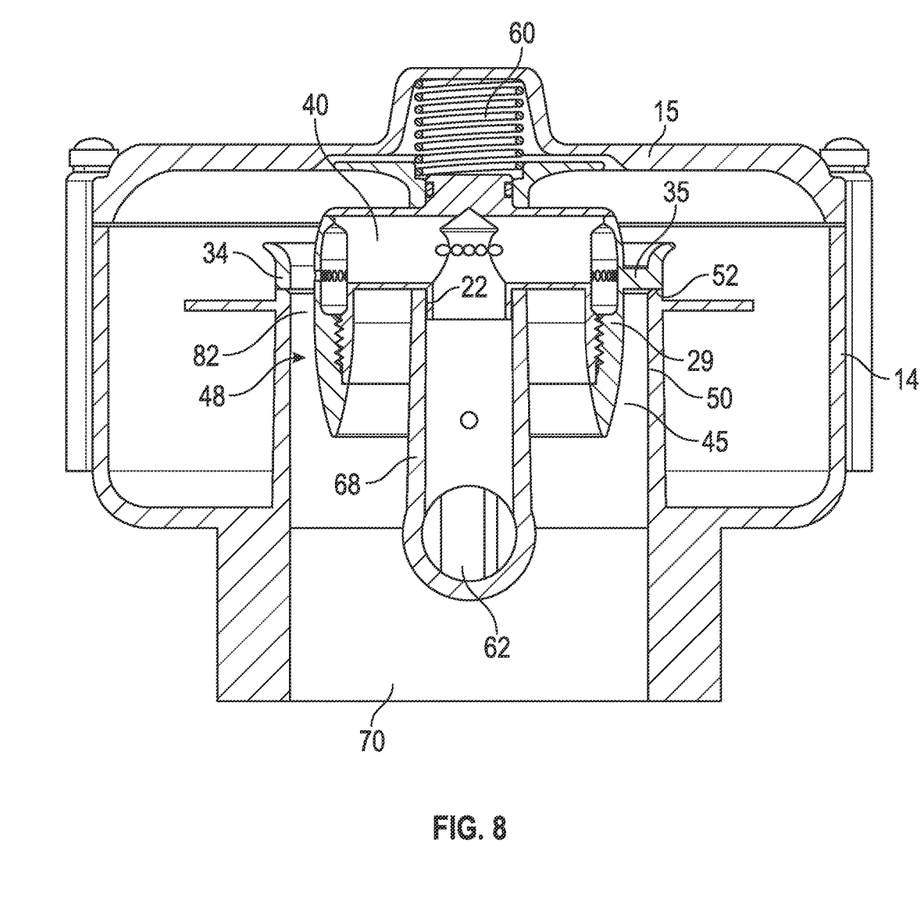
FIG. 8 is a cross-section of the assembled carburetor and air fuel mixing venturi device on the lines 8-8 of FIG. 7.

FIGS. 2 to 6 illustrate a first embodiment of a gaseous fuel and air mixing venturi device 10 which is adapted for installation in a gaseous fuel carburetor 12, while FIG. 1 illustrates the venturi device 10 positioned for mounting in a carburetor housing 14, with the cover or cover plate 15 of the housing separated from the housing and positioned above the venturi device, and partially cut away to reveal the venturi device. FIGS. 7 and 8 illustrate the venturi device installed in carburetor 12.

Figure 3:
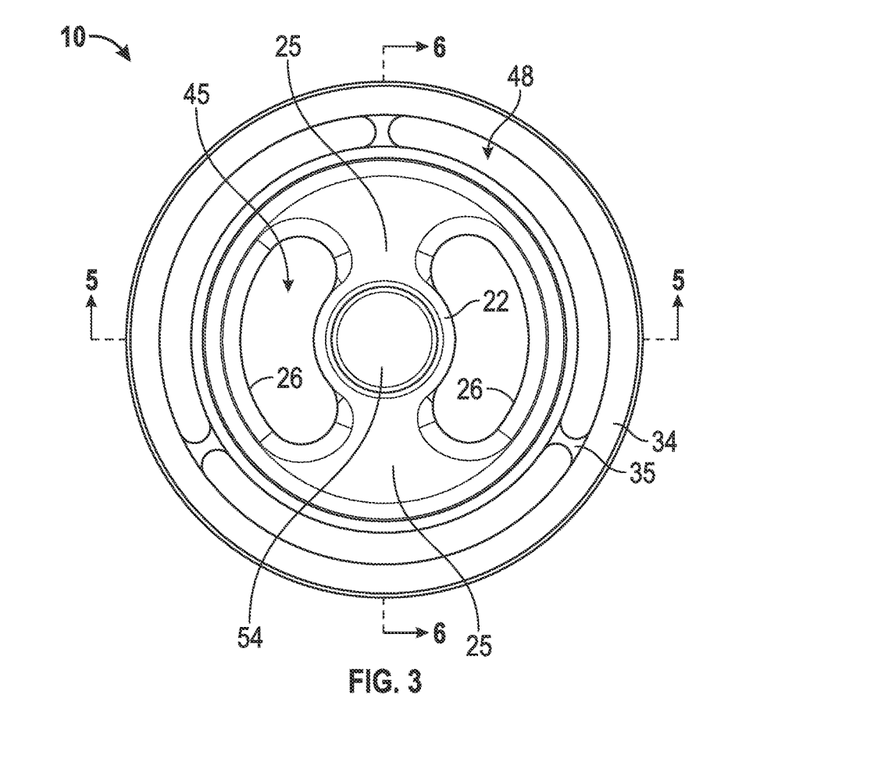
FIG. 3 is a top plan view of the main body of the venturi insert device of FIG. 2.
Figure 4:
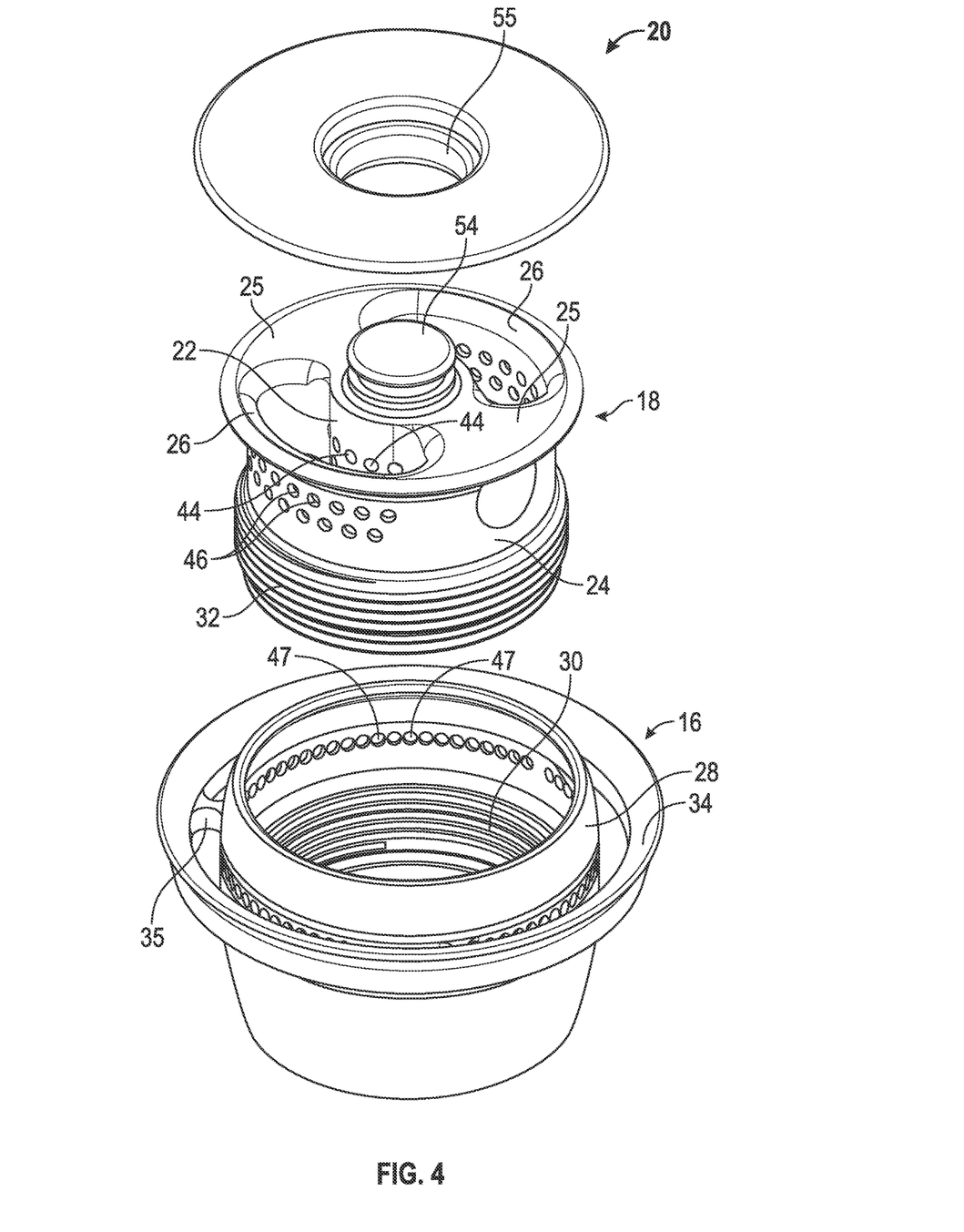
FIG. 4 is an exploded view of the components of the venturi insert device of FIGS. 1 to 3.

As best illustrated in FIG. 4, the venturi device 10 is formed in three parts, comprising an outer annular body 16, an inner body 18, and a guide plate or spring seating member 20. Inner body 18 has a central hub 22 and an outer annular wall 24 secured to the hub via diametrically opposite connector portions 25 at the end of the inner body, forming air inlet openings 26. Outer body 16 has an inner annular wall 28 designed for connection to the outer annular wall 24 of the inner body via mating threaded portions 30, 32 on the inner surface of the annular wall 28 of body 16 and the outer surface of the annular wall 24 of body 18, respectively. An outer annular rim 34 is secured to the inner annular wall 28 of outer body 16 via connecting webs or portions 35, as best illustrated in FIG. 3.

Figure 2:
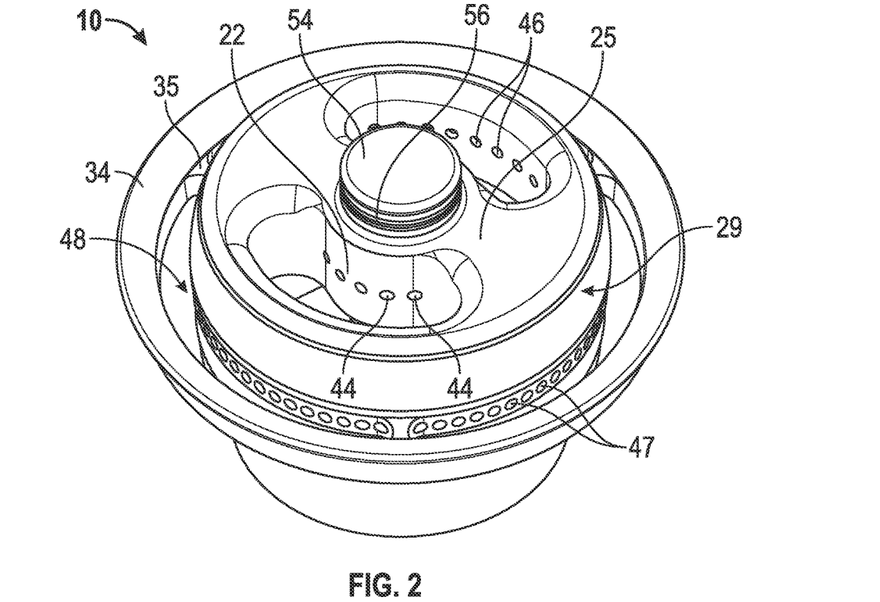
FIG. 2 is a top perspective view of the main body of the venturi insert device of FIG. 1 with the top plate or spring mounting plate removed to reveal air inlets and gaseous fuel inlets into the coaxial venturi passageways in the device.
Figure 5:
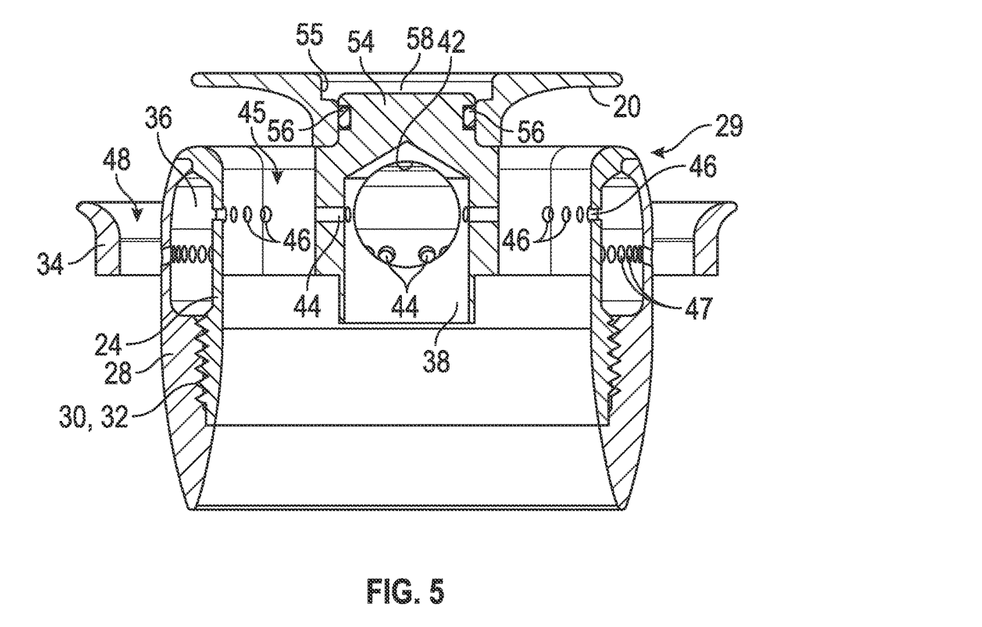
FIG. 5 is a cross-section on the lines 5-5 of FIG. 3.
Figure 6:
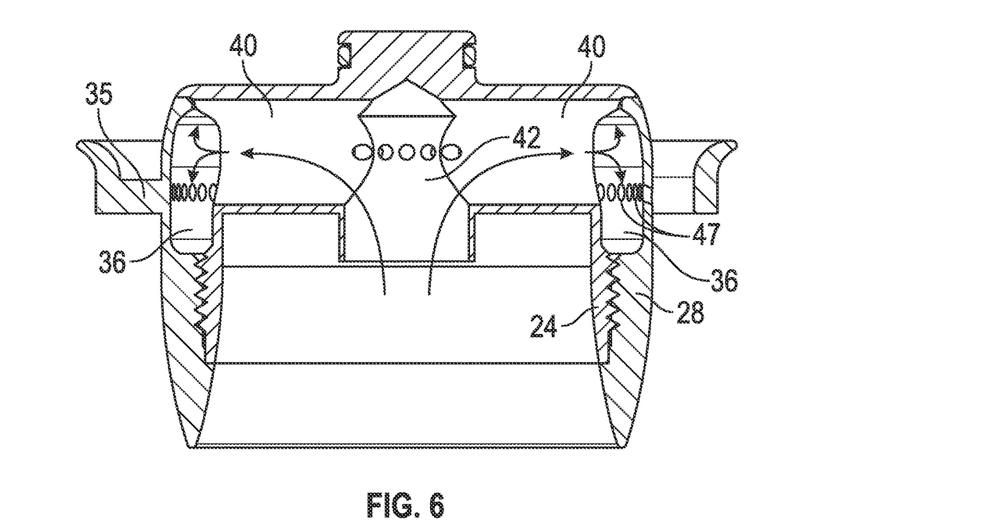
FIG. 6 is a cross-section on the lines 6-6 of FIG. 3.

When the inner and outer annular bodies are secured together as illustrated in FIGS. 2, 5 and 6, the annular walls 24 and 28 together form an annular venturi member or body 29 surrounding central hub 22. Annular body 29 has an internal, annular gaseous fuel supply chamber 36 which communicates with a central fuel inlet chamber 38 of hub 22 via passageways 40 in connector portions 25 which terminate in chamber 36, as illustrated in FIGS. 5 and 6. Central hub 22 has a gaseous fuel outlet port 42 which communicates with the inner ends of passageways 40, and also has a series of spaced openings or fuel supply ports 44 around its periphery which also provide communication with a first or inner venturi passageway 45 between the central hub 22 and annular member 29. A plurality of fuel outlets or ports 46 extending at spaced intervals around wall 24 provide communication between the annular fuel supply chamber 36 and inner venturi passageway 45, while a plurality of fuel outlets or ports 47 at spaced intervals around outer wall 28 provide communication between annular fuel supply chamber 36 and an outer venturi passageway 48 formed between annular member 29 and outer annular rim 34 and the wall 50 of the carburetor air-fuel mixer on which rim 34 is seated after installation (see FIGS. 7 and 8). Rim 34 is of predetermined configuration and dimensions for seating on an air-fuel mixer seating rim 52 of the carburetor.

The annular venturi body member 29 and annular outer rim 34 are designed to form throat portions 80, 82 of reduced cross sectional dimensions along the length of each passageway 45, 48 which are spaced from the larger inlet end of the respective passageway. The plurality of inner and outer fuel outlets or ports 46, 47 from the fuel supply chamber 36 are designed to supply fuel in a radial direction around the entire circumference of the inner and outer venturi passageways into the throat portions of the passageways which are of reduced cross-sectional dimensions. Fuel supply outlets or ports 44 of fuel inlet chamber 38 are also designed to supply fuel radially into the throat portion 80 of the inner venturi passageway. Fuel supplied radially into the passageways is thus mixed with air flowing axially through the venturi passageways for improved air-fuel mixing, and the air-fuel mixture at the outlet ends of the venturi passageways is supplied to air-fuel mixture outlet 70 of carburetor 12.

Hub 22 has a raised central boss or seat 54 over which the central opening 55 in plate 20 is engaged, and an O-ring seal 56 is provided between the opposing outer circumference of boss 54 and inner circumference of opening 55 in order to retain plate 20 during assembly, as best illustrated in FIG. 5. This provides a recessed seat 58 for receiving the end of the existing spring 60 of the prior air-fuel mixing device after removal of the remainder of the prior device from carburetor 12 (see FIGS. 7 and 8). This spring acts between the carburetor cover plate 15 and the plate 20 of the venturi insert device 10, retaining the device in position between the cover plate 15 and rim 52 of the air-fuel mixer.

The gaseous fuel and air mixing venturi insert device 10 is designed for retrofitting into an existing gaseous fuel carburetor, replacing the conventional spring mass air/fuel mixing section of the carburetor, as described in more detail below. The insert device 10 of this embodiment is designed for installation in carburetor 12 after the existing air-fuel mixing device has been removed from the mixing device seating area in the end of carburetor 12. FIG. 1 illustrates fuel and air mixing venturi insert device 10 in position for installation in the air-fuel mixer seating area, while FIGS. 7 and 8 illustrate device 10 installed in carburetor 12. In one embodiment, carburetor 12 is an Impco 200 carburetor as manufactured by Impco Technologies, Inc. of Cerritos, Calif., and is retrofitted with the mixing venturi insert device 10 as illustrated in FIGS. 7 and 8 after removal of the conventional spring mass/diaphragm air-fuel mixing valve. In other embodiments, insert device 10 may be dimensioned for fitting into the air-fuel mixer seating area of other types of carburetor, including the Impco 600 series carburetors as manufactured by Impco Technologies, Inc. which have single or multiple housings or seating recesses for holding air/fuel mixing devices. In the latter case, multiple insert devices 10 may be installed in place of the existing air/fuel mixing devices.

As illustrated in FIGS. 1, 7 and 8, carburetor 12 has an outer housing 14, gaseous fuel supply or inlet port 62, air inlet 64, and air-fuel mixture outlet 70. Cover plate 15 is designed to be secured to the outer rim 65 of housing 14 via screw fasteners 66. Gaseous fuel is supplied from inlet port 62 to fuel supply stem 68 at the center of housing 14, and annular inner wall 50 of the gas-fuel mixing section of the carburetor surrounds stem 68. An annular flange 69 surrounds the rim 52 of wall 50. The air/fuel mixture supply outlet 70 of the gas-fuel mixing section communicates with the existing butterfly assembly (not illustrated) in a similar manner to that described for the prior mixing venturi device of U.S. Pat. No. 7,410,152, the contents of which are incorporated herein by reference.

In order to install venturi insert device 10 in carburetor 12, the cover plate 15 and spring 60 are first removed, along with the prior air/fuel mixing valve. The rim 34 and central boss 22 of the venturi insert device 10 are then aligned with the rim 52 and fuel stem 68 of the air-fuel mixer seating area in the carburetor, respectively, as illustrated in FIG. 1, and moved downward until rim 34 is seated on rim 52 and the lower rim of hub 22 seats in the end of fuel supply stem 58 as in FIGS. 7 and 8. The lower end of spring 60 is then engaged in recessed seat 55 at the center of plate 20, and the cover plate 15 is re-fastened to the outer rim 65 of carburetor housing 14 with screws 66.

During operation, all air entering the carburetor inlet 64 flows in the direction of the arrows in FIG. 7 through the passageway formed between the cover plate 15 and guide plate 20 of the venturi insert assembly and the opposing ends of the annular body 29 and outer rim 34 of the insert device, and is then guided down into the inlet ends of the inner and outer venturi passageways 45 and 48. At the same time, gaseous fuel supplied via inlet port 62 flows through stem 68 and into the inner fuel chamber 38 of hub 22, then outwards via port 42 and passageways 40 into the annular fuel supply chamber 36, as illustrated by the arrows in FIG. 6. At the same time, some fuel is drawn outwards from chamber 38 into the inner venturi passageway 45 via ports 44. Fuel is also drawn from annular fuel supply chamber 36 inwards from openings 46 into the passageway 45 and radially outwards via openings 47 into the outer venturi passageway 48. As seen in FIGS. 7 and 8, both venturi passageways are of reducing cross sectional dimensions from the inlet ends of the passageways, and then increase in cross sectional dimensions towards outlet ends 72,74. The portions of the passageways which have the smallest cross-sectional area for airflow through venturi insert device 10 are so-called venturi throats and produce the highest air velocity and the lowest pressure. The fuel supply ports 44, 46 and 47 in the central hub 22 and annular venturi body 29 are located in these areas of low pressure within passages 45 and 48. As the airflow through the inner and outer venturi passageways increases, so does the pressure drop across the fuel inlet ports, causing increased fuel flow. Passages 45 and 48 and fuel ports 44, 46 and 47 can be sized to maintain a near constant air/fuel ratio for various flows when the fuel pressure at fuel inlet 62 is maintained at the same value as the air pressure at air inlet 64 of carburetor 12. Application variables, such as fuel composition and pressure drops in the fuel and air intake plumbing, would require numerous sizes of fuel ports in order to run with the correct pressure at fuel inlet 62. This problem may be reduced or overcome by over sizing the fuel ports and adjusting the carburetor fuel mixture screw 75 to restrict fuel flow until the pressure at fuel inlet 62 matches the pressure at air inlet 64 and the air fuel ratio remains constant through all engine loads.

Figure 9:
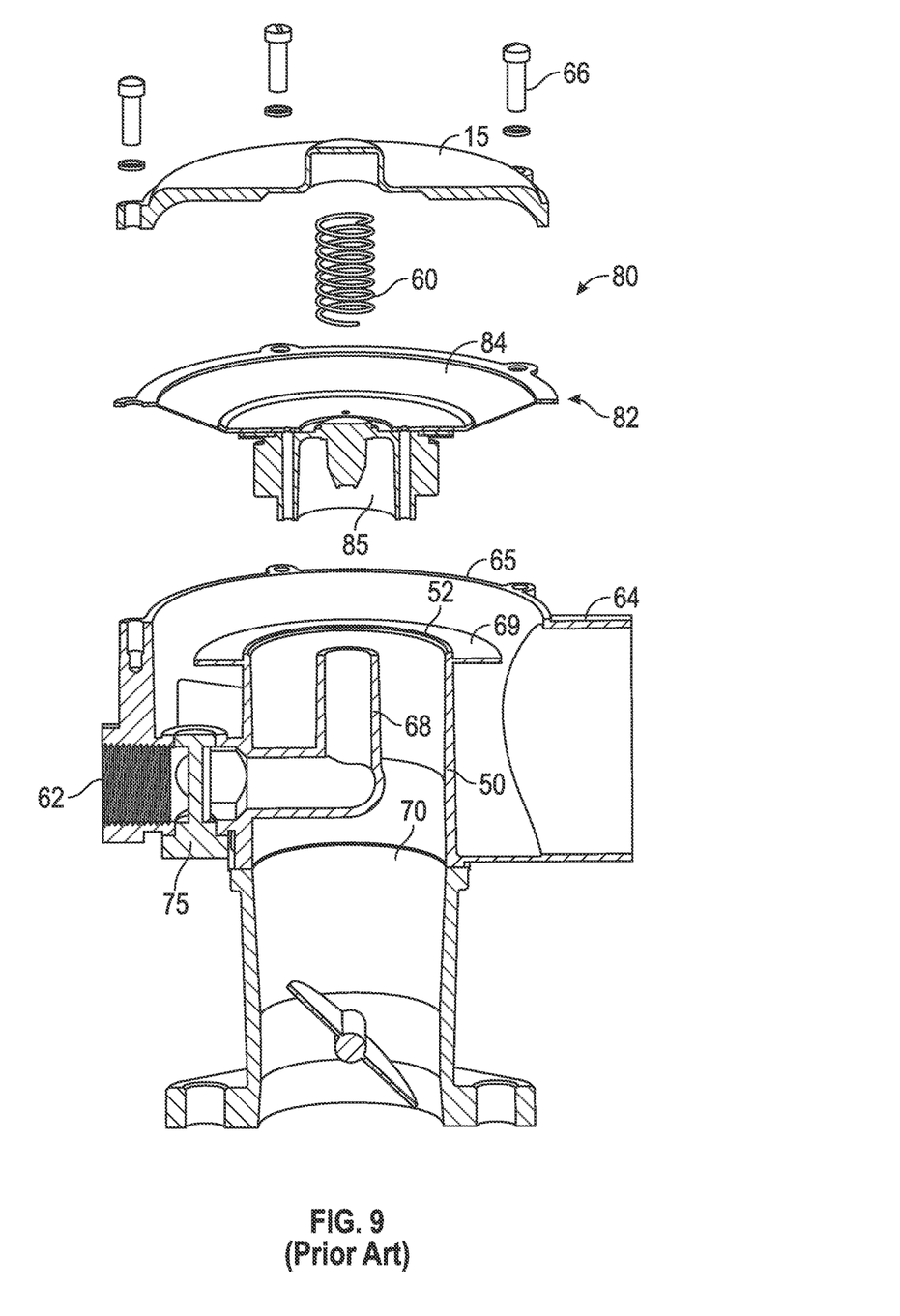
FIG. 9 is a cross-sectional exploded view of a prior art carburetor including a prior art air-fuel mixing device.

A method of retrofitting a prior art carburetor 80 as illustrated in FIG. 9 with air-fuel mixing venturi device 10 of FIGS. 1 to 8 replacing prior art air-fuel mixing device 82 will now be described. In order to install venturi insert device 10, the user first removes cover plate 15, spring 60, and diaphragm 84 and air/fuel valve 85 of the existing air-fuel mixing device. Venturi device 10 is then positioned over the open end of the carburetor housing so that fuel inlet chamber 38 of hub 22 is aligned with fuel inlet port 68 and annular rim 34 is aligned with seating rim 52 of carburetor 80. Venturi device 10 is then lowered into engagement with the housing, the lower end of spring 60 is seated in recessed seat 58, and the cover plate 15 is re-attached over the open end of the carburetor housing with fasteners 66.

The venturi insert assembly in the above embodiment has a plurality of fuel inlet passages or supply ports positioned around the low-pressure region of the venturi throat to direct fuel radially into the throat, distributing the fuel across the flow profile. This, along with the separate inner and outer venturi mixing passageways, increases air-fuel mixing and supplies the engine with a relatively homogenous air/fuel mixture from the outlet ends 72 and 74 of the passageways which communicate with the air/fuel mixture outlet 70 of the carburetor.

Although the venturi insert assembly of the above embodiment has inner and outer annular venturi passageways, one or more additional co-axial venturi passageways may be provided around the outer venturi passageway in a similar manner in alternative embodiments, for additional mixing capability. In another alternative embodiment, a single annular venturi passageway may be provided (excluding the outer venturi passageway of the above embodiment), with an inner fuel chamber and outer annular fuel chamber having ports through which fuel is directed radially inwardly and outwardly, respectively, into the venturi throat area of the passageway for improved mixing over the prior art devices.

Device 10 does not require any modifications to the existing air inlet, fuel inlet, or manifold plumbing. It is relatively small, simple in structure, and relatively inexpensive to manufacture and install, and has the advantage of using the stock carburetor spring 60 in addition to stock carburetor cover 15. The venturi insert device described above avoids the need to completely replace an existing carburetor, instead allowing replacement of only the existing spring load/diaphragm mixing device. Venturi insert device 10 is retrofitted to the existing carburetor body, therefore requiring no modification of the engine's air intake system. The existing carburetor butterfly assembly and fuel mixture screw can still be used and do not have to be replaced. This significantly reduces the costs associated with installing a conventional venturi mixer that eliminates the entire carburetor assembly. A multitude of venturi inserts with various air passage and fuel port sizes and different sizes and configurations can be provided to fit into the air/fuel mixer cavities of different carburetor models. This would allow the user to select the optimum air/fuel mixer for a specific engine application, resulting in better starting, smoother idle, a more consistent air/fuel mixture, and cleaner exhaust emissions.

The venturi insert device in one embodiment is designed to maintain a near stoichiometric mixture throughout the operating range of the engine. Some applications, such as lean burn engines, require a venturi insert sized to run at an air/fuel ratio other than stoichiometric. Final corrections to the air/fuel ratio are made by an upstream air/fuel ratio controller.

The venturi insert device 10 described above has no moving parts, and all dynamic or moving components of the air fuel mixing section are eliminated. This eliminates or reduces the potential for unstable operation caused by interactions between the air/fuel ratio control and the conventional spring mass system of a carburetor air/fuel mixing section. This lowers maintenance costs, improves stability, and decreases exhaust emissions. Stable or relatively stable engine operation allows the air/fuel ratio control to achieve reduced exhaust emissions. The venturi insert device can be quickly and easily retrofitted in an existing carburetor device as described above, after removal of the existing air/fuel mixing section.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

I claim:

1. A gaseous fuel and air mixing venturi device for a gaseous fuel carburetor, comprising:
    a venturi body having at least two venturi passageways, each passageway having an air inlet end, an air-fuel mixture outlet end, and a venturi throat of reduced cross-sectional area;
    the venturi body being of predetermined shape and dimensions adapted for seating engagement in a carburetor housing between the carburetor air inlet and air-fuel mixture outlet such that the air inlet ends of the venturi passageways communicate with the air inlet of the carburetor and the air-fuel mixture outlets of the venturi passageways communicate with the air fuel mixture outlet of the carburetor, the venturi body having a fuel inlet chamber with an inlet configured for communication with a gaseous fuel inlet port of the carburetor; and
    the body having a plurality of fuel supply ports communicating with the fuel inlet chamber for supplying fuel to throat areas of the venturi passageways to mix with the air flowing in the venturi passageways.

2. The device of claim 1, wherein the venturi passageways comprise coaxial inner and outer venturi passageways.

3. The device of claim 2, wherein each venturi passageway is of annular cross-sectional shape and the fuel supply ports are located at spaced intervals around a periphery of each passageway to direct fuel radially into the passageway.

4. The device of claim 3, wherein the fuel supply ports are located at the venturi throat of each passageway.

5. The device of claim 2, wherein the venturi body comprises a central hub containing the fuel inlet chamber, an inner annular member secured to the central hub with an annular space between the inner annular member and the central hub comprising the inner venturi passageway, and an outer annular member secured to the inner annular member with an annular space between the inner and outer annular members comprising at least part of the outer venturi passageway.

6. The device of claim 5, wherein the inner annular member has an annular gas supply chamber, and at least two radial members extend between the central hub and annular gas supply chamber, each radial member having an internal passageway having inner and outer ends and communicating with the fuel inlet chamber at the inner end and with the annular gas supply chamber at the outer end, and the inner annular member having an inner wall having a ring of spaced first fuel supply ports configured to direct fuel from the gas supply chamber into the inner venturi passageway and an outer wall having a ring of spaced second supply ports configured to direct fuel from the gas supply chamber into the outer venturi passageway.

7. The device of claim 6, wherein the central hub has a ring of spaced third fuel supply ports configured to direct fuel from the inlet fuel chamber outwardly into the inner venturi passageway, whereby fuel is directed in both radially inward and outward directions into the inner venturi passageway.

8. The device of claim 6, wherein the first fuel supply ports are axially offset from the second fuel supply ports.

9. The device of claim 5, further comprising at least two spaced connecting portions between the inner and outer annular member defining a predetermined annular gap between the annular members forming part of the outer venturi passageway.

10. The device of claim 9, wherein the outer annular member comprises an annular rim configured for seating on an air-fuel mixer seating rim of an annular wall of the air-fuel mixing section of the carburetor, the outer venturi passageway having an inner annular wall comprising an outer wall of the inner annular member and an outer annular wall comprising the annular rim and part of the annular wall of the air-fuel mixing section of the carburetor.

11. The device of claim 1, wherein the venturi body has a central seat portion and an annular plate engaged over the seat portion and extending over the inlet end of the inner venturi passageway, the annular plate and seat portion being configured for engagement with a carburetor biasing spring extending between the annular plate and a cover plate of the carburetor, and the annular plate forming at least part of a passageway for air flow into the ends of the venturi passageways.

12. The device of claim 2, wherein the venturi body comprises a central hub portion, a first annular member surrounding the central hub portion, the inner venturi passageway comprising annular inner passageway between the central hub portion and first annular member, and a second annular member surrounding the first annular member to define at least an inlet end of the outer venturi passageway between the first and second annular members.

13. The device of claim 12, wherein the first annular member has an internal annular fuel supply chamber having a plurality of inwardly directed fuel outlets and outwardly directed fuel outlets for supplying fuel in a radial direction to the throat portions of the inner and outer venturi passageways, respectively.

14. The device of claim 13, wherein the hub portion contains the fuel inlet chamber and has a plurality of fuel outlets spaced around the periphery of the fuel inlet chamber and configured to supply fuel radially outwardly from the fuel inlet chamber to the throat portion of the inner venturi passageway.

15. A gaseous fuel and air mixing venturi device for a gaseous fuel carburetor, comprising:

a venturi body having at least one venturi passageway having an air inlet end, an air-fuel mixture outlet end, and a venturi throat of reduced cross-sectional area;

the venturi body being of predetermined shape and dimensions adapted for seating engagement in a carburetor housing between the carburetor air inlet and air-fuel mixture outlet such that the air inlet end of the venturi passageway communicates with the air inlet of the carburetor and the air-fuel mixture outlet of the venturi passageway communicates with the air fuel mixture outlet of the carburetor, the venturi body having a fuel inlet chamber with an inlet configured for communication with a gaseous fuel inlet port of the carburetor;

the body having a plurality of fuel supply ports communicating with the fuel inlet chamber for supplying fuel in a radial direction only to throat area of the venturi passageway to mix with the air flowing in the venturi passageway; and wherein the venturi body comprises a central hub containing the fuel inlet chamber, and an annular member secured to the central hub with an annular space between the annular member and the central hub defining the venturi passageway, the annular member having an annular gas supply chamber communicating with the fuel inlet chamber, the central hub having a first ring of spaced fuel supply ports spaced around the hub for directing fuel radially outward from fuel inlet chamber into the venturi passageway, and the annular member having an inner wall having a second ring of spaced fuel supply ports configured for directing fuel radially inward from the annular gas supply chamber into the inner venturi passageway.

16. A method of retrofitting a carburetor with an air-fuel mixing venturi insert device, comprising:

removing an existing cover plate and air-fuel mixing device from a carburetor to leave a cavity and expose at least one air-fuel mixer seating rim of the carburetor;

placing an air-fuel mixing venturi insert device having at least two annular venturi passageways into the cavity left by removal of the prior air-fuel mixing device, with a fuel inlet port of the air-fuel mixing venturi insert device aligned with a fuel inlet port of the carburetor and an outer rim of the air-fuel mixing venturi insert device aligned and engaged with the air-fuel mixer seating rim of the carburetor; and re-attaching the existing cover plate to the carburetor over the air-fuel mixing venturi insert device with a biasing spring acting extending between a spring seat on the inner surface of the cover and a spring seating recess at the end of the air-fuel mixing venturi insert device.

* * * * *